(12) United States Patent
Gersmann et al.

(10) Patent No.: US 10,415,650 B2
(45) Date of Patent: Sep. 17, 2019

(54) DEVICE FOR TRANSMITTING A TORQUE FROM AN INTERNAL COMBUSTION ENGINE TO AN AUXILIARY UNIT

(71) Applicant: Winkelmann Powertrain Components GmbH & Co. KG, Ahlen (DE)

(72) Inventors: Daniel Gersmann, Enniger (DE); Alexander Goettmann, Muenster (DE)

(73) Assignee: Winkelmann Powertrain Components GmbH & Co. KG, Ahlen (DE)

( * ) Notice: Subject to any disclaimer, the term of this patent is extended or adjusted under 35 U.S.C. 154(b) by 231 days.

(21) Appl. No.: 15/531,785

(22) PCT Filed: Dec. 15, 2015

(86) PCT No.: PCT/EP2015/079874
§ 371 (c)(1),
(2) Date: May 31, 2017

(87) PCT Pub. No.: WO2016/096909
PCT Pub. Date: Jun. 23, 2016

(65) Prior Publication Data
US 2017/0261042 A1    Sep. 14, 2017

(30) Foreign Application Priority Data
Dec. 16, 2014  (DE) .......................... 10 2014 118 700

(51) Int. Cl.
*F16D 7/04*  (2006.01)
*F16D 43/202*  (2006.01)
(Continued)

(52) U.S. Cl.
CPC .............. *F16D 7/046* (2013.01); *F02B 63/06* (2013.01); *F16D 7/044* (2013.01);
(Continued)

(58) Field of Classification Search
CPC ...... F16D 7/046; F16D 43/2026; F16D 7/044; F16D 43/2024; F02B 63/06; F16H 35/10
(Continued)

(56) References Cited

U.S. PATENT DOCUMENTS 3,192,740 A    7/1965  Stamates
8,016,685 B2 *  9/2011  Kurosu .................. F16D 7/046
                                                    464/38
(Continued)

FOREIGN PATENT DOCUMENTS

EP    1 106 854 A2    6/2001
EP    2 722 558 A1    4/2014
(Continued)

OTHER PUBLICATIONS

International Search Report of PCT/EP2015/079874, dated Apr. 12, 2016.
(Continued)

*Primary Examiner* — Greg Binda
(74) *Attorney, Agent, or Firm* — Collard & Roe, P.C.

(57) ABSTRACT

An apparatus for transfer of a torque from an internal combustion engine to an auxiliary unit has an auxiliary unit shaft and a pulley rotatably disposed on the auxiliary unit housing. The pulley and the auxiliary unit shaft are connected with one another by an overload protection device configured to interrupt the connection between the pulley and the auxiliary unit shaft if a predetermined torque is exceeded. The overload protection device has a spring washer having multiple spring arms connected, on the end side, with connection elements of a disk-shaped driver until the predetermined torque is reached. Each connection element is configured as a pocket-shaped mounting in the driver, wherein the respective spring arm end lies against a contact surface of the pocket-shaped mounting under spring
(Continued)

tension, with force fit. The respective pocket-shaped mounting is configured as a hook-shaped crosspiece cut out of the driver in certain regions.

11 Claims, 5 Drawing Sheets

(51) Int. Cl.
 *F16H 35/10* (2006.01)
 *F16H 55/36* (2006.01)
 *F02B 63/06* (2006.01)
(52) U.S. Cl.
 CPC ..... *F16D 43/2024* (2013.01); *F16D 43/2026* (2013.01); *F16H 35/10* (2013.01); *F16H 55/36* (2013.01)
(58) Field of Classification Search
 USPC .............. 464/37, 38; 474/70, 94; 192/56.53, 192/56.61
 See application file for complete search history.

(56) References Cited

U.S. PATENT DOCUMENTS

| 2001/0027134 A1* | 10/2001 | Ota | F16D 7/021 464/37 |
|---|---|---|---|
| 2012/0285784 A1 | 11/2012 | Cochran et al. | |

FOREIGN PATENT DOCUMENTS

| JP | S59 150025 U | 10/1984 |
|---|---|---|
| JP | 2000 352428 A | 12/2000 |

OTHER PUBLICATIONS

International Preliminary Report on Patentability for PCT/EP2015/079874 dated Jun. 20, 2017.

\* cited by examiner

DEVICE FOR TRANSMITTING A TORQUE FROM AN INTERNAL COMBUSTION ENGINE TO AN AUXILIARY UNIT

CROSS REFERENCE TO RELATED APPLICATIONS

This application is the National Stage of PCT/EP2015/079874filed on Dec. 15, 2015, which claims priority under 35 U.S.C. § 119 of German Application No. 10 2014 118 700.8 filed on Dec. 16, 2014, the disclosure of which is incorporated by reference. The international application under PCT article 21(2) was not published in English.

BACKGROUND OF THE INVENTION

1. Field of the Invention

The invention relates to an apparatus for transfer of a torque from an internal combustion engine to an auxiliary unit, particularly a compressor of an air conditioning system of a motor vehicle, having an auxiliary unit shaft and a pulley disposed on the auxiliary unit housing so as to rotate, wherein the pulley and the auxiliary unit shaft are connected with one another by way of an overload protection device, wherein the overload protection device is configured in such a manner that the connection between the pulley and the auxiliary unit shaft is interrupted if a predetermined torque is exceeded, wherein the overload protection device has a spring washer having multiple spring arms, which are connected, on the end side, with connection elements of a disk-shaped driver until the predetermined torque is reached.

2. The Prior Art

In motor vehicles equipped with an air conditioning system, the compressor of the air conditioning system is generally driven by the crankshaft of the internal combustion engine, by way of a belt drive. If the compressor of the air conditioning system fails, this has the result that the entire belt drive of the motor vehicle becomes jammed or is damaged.

In order to remedy this defect, apparatuses are known that have an overload protection device in the powertrain between the pulley of the compressor and the compressor shaft, which device guarantees that the drive connection between the pulley and the compressor shaft is interrupted if the compressor of the air conditioning system fails. The pulley can then rotate freely on the compressor housing, so that the entire belt drive of the motor vehicle is not jammed or damaged.

An apparatus having an overload protection device is known from EP 2 722 558A1. In this apparatus, the overload protection device has a spring washer that is connected with the pulley so as to rotate with it, as well as a driver element that is connected with the compressor shaft so as to rotate with it. The spring washer has spring arms that project radially outward beyond the actual washer and extend in the circumference direction, the ends of which arms is clamped in place between the driver element and clamping plates attached to the driver element. If the torque exceeds a predetermined amount, the ends of the spring arms slip out of this clamping connection, so that no further transfer of torque takes place between the pulley and the compressor shaft, and the pulley can rotate freely on the compressor housing.

The structure of this overload protection device is very complicated, specifically both with regard to its production and its installation, since the overload protection device consists of a plurality of individual parts, namely not only the spring element and the driver element, but also the additional clamping plates and rivet-type attachment elements for attaching the clamping plates on the driver element.

A similar apparatus having an overload protection device is known from US 2012/0285784 A1, which does not, however, have a driver as a separate component. Instead, multiple bores are symmetrically disposed on a common circumference, in a region of the pulley that borders on the belt profile, into which bores screw-shaped elements are inserted and secured by means of a counter-nut, wherein the screw-shaped elements have pocket-shaped mountings in the head region, on the outside, into which the end of a spring arm of a spring washer engages, in each instance. In this regard, the mountings and the ends of the spring arms are structured in such a manner that in the event of an overload, the ends of the spring arms can slip out of the mountings. The structure of this overload protection device is also very complicated and requires improvement.

SUMMARY OF THE INVENTION

It is the task of the invention to improve a previously described apparatus in such a manner that its structure is significantly simplified, the design of the response behavior of the overload protection device is improved, and stresses in the direction of the axis of rotation are avoided.

This task is accomplished according to the invention, in the case of an apparatus of the type indicated initially, in that the respective connection element of the driver is configured as a pocket-shaped mounting in the driver, in each instance, wherein the end of the respective spring arm lies against a contact surface of the pocket-shaped mounting under spring tension, with force fit, wherein the respective pocket-shaped mounting is configured as a crosspiece formed in hook shape and cut out of the driver in certain regions.

The structure of the overload protection device is significantly simplified, according to the invention, as compared with known apparatuses of this type; the overload protection device fundamentally consists of only two components, namely the spring washer and the disk-shaped driver, which components can be produced in simple manner, for example by means of deep-drawing. Installation is also extremely simple, because the spring ends of the spring washer merely have to be introduced into the pocket-shaped mountings in the driver, counter to their spring tension, and these ends then lie against the respective contact surface of the pocket-shaped mounting with force fit. No additional load is transferred or built up in the direction of the axis of rotation as the result of the spring washer and its spring arms being supported on the driver, so that stress on the bearing of the pulley is not increased by the overload protection device. The pocket-shaped mountings are an integral part of the driver, so that no additional elements that must be connected with the driver are required.

In a preferred embodiment, it is provided that the end of the respective spring arm and the respective contact surface have shaped elements that are coordinated with one another, and thereby in addition to the force-fit connection, a shape-fit connection is also created.

These shaped elements are preferably configured as concave or convex regions, which can be easily stamped during the production process. The ends of the spring arms are thereby held on the driver not only with force fit but also with shape fit, and this additionally makes the design of the overload protection device more variable with regard to its response behavior.

According to a preferred embodiment, it is provided that the crosspiece of the respective pocket-shaped mounting is provided with an additional reinforcement.

This reinforcement can be stamped into the crosspiece, for example. The pocket-shaped mountings are then rigid, to a great extent; the spring properties that are required for effectiveness of the overload protection device are then solely provided by the spring washer and the spring arms.

Alternatively, it can also be provided that the respective crosspiece is configured to be resilient. This results in further variability with regard to the design of the response behavior of the overload protection device.

In a preferred further embodiment, it is provided that the driver has a supporting arm directed toward the related spring arm and lying against it, circumferentially adjacent to the respective crosspiece. The spring properties of the spring arms can be influenced by means of this additional supporting arm, on the one hand, and on the other hand, it can be ensured that in the event of an overload, the spring arms do not come into contact with the driver, so that free rotatability of the components is guaranteed.

In a preferred embodiment, it is provided, in this regard, that the respective supporting arm is configured as a crosspiece cut out of the driver in certain regions. The respective supporting arm is then an integral part of the driver, and no additional components are required. In this regard, the respective supporting arm is preferably angled away at the free end, in order to create a greater contact surface on the respective spring arm. Furthermore, the respective supporting arm can also be provided with an additional reinforcement.

Furthermore, it is provided that the spring washer has at least three symmetrically distributed spring arms. These project radially and, if applicable, tangentially beyond the actual spring washer, and extend in the circumference direction.

Finally, it is particularly preferably provided that the spring washer has a circumferential projection that lies against the driver as long as the predetermined torque is not exceeded. The spring washer supports itself on the driver with the circumferential projection, and thereby the spring washer and the driver form a unit that is free of force toward the outside, and stresses in the direction of the axis of rotation are avoided. When the predetermined torque is exceeded, the spring deforms on the basis of its spring tension when the spring arms are released, in such a manner that no further contact with the driver exists.

BRIEF DESCRIPTION OF THE DRAWINGS

The invention will be explained in greater detail below, using the drawing. This shows, in FIG. 1 a side view of an apparatus according to the invention, FIG. 2 a section along the line A-A in FIG. 1, FIG. 3 a side view of a spring washer of the apparatus, FIG. 4 a side view of a driver of the apparatus, FIG. 5 the section along the line A-A in FIG. 1 with clarification of the forces in effect, FIG. 6 a section along the line B-B in FIG. 1, FIGS. 7 to 10 schematic representations of the disengagement process of the overload protection device, from the starting state to the uncoupled state, FIG. 11 a perspective view of the disk-shaped driver and the spring washer in the coupled state, according to a modified embodiment, and FIG. 12 a side view of FIG. 11, partly in section.

DETAILED DESCRIPTION OF THE PREFERRED EMBODIMENTS

An apparatus for transfer of torque from an internal combustion engine, not shown, to an auxiliary unit of a motor vehicle, is indicated in general with 1. In the exemplary embodiment shown, the auxiliary unit is a compressor of an air conditioning system, of which a compressor housing 2 is indicated. The auxiliary unit has an auxiliary unit shaft, in other words a compressor shaft 3 in the exemplary embodiment, which shaft is supposed to be driven by means of the apparatus 1, by way of a belt drive. This belt drive is driven by a pulley disposed on the crankshaft of the motor vehicle, which shaft stands in a drive connection with a pulley 4 of the apparatus 1 by way of a belt, not shown. This pulley 4 is mounted on the compressor housing or a lateral attachment 2a of the compressor housing 2, so as to rotate, by way of a bearing 5.

In order for the torque to be transferred from the pulley 4 to the compressor shaft 3, but for this transfer to be interrupted if the compressor is damaged and the compressor shaft 3 can no longer rotate, the apparatus 1 has an overload protection device in the powertrain between the pulley 4 and the compressor shaft 3. This overload protection device has a spring washer 6 and a disk-shaped driver 7. In this regard, in the exemplary embodiment, the spring washer 6 is connected with the compressor shaft 3 so as to rotate with it. For this purpose, in the exemplary embodiment the spring washer 6 is set onto the compressor shaft 3, and attached in torque-proof manner by means of a nut 8. Of course, a different method of torque-proof connection between the spring washer 6 and the compressor shaft 3 is also possible. The disk-shaped driver 7 is connected with the pulley 4 so as to rotate with it, in contrast. In the exemplary embodiment, the driver 7 is screwed onto the pulley 4 by means of screws 9 that are symmetrically distributed over the circumference, by means of a common radius. Of course, the driver 7 can be attached to the pulley 4 in torque-proof manner in a different way, for example with shape fit, for which purpose the driver 7 has finger-like elements, in known manner, which elements engage into corresponding indentations in the face side of the pulley 4. In the case of such an embodiment, a damping unit composed of elastomer elements or the like can additionally be integrated into this shape-fit connection, but this is not decisive within the scope of the invention.

Figure 1:
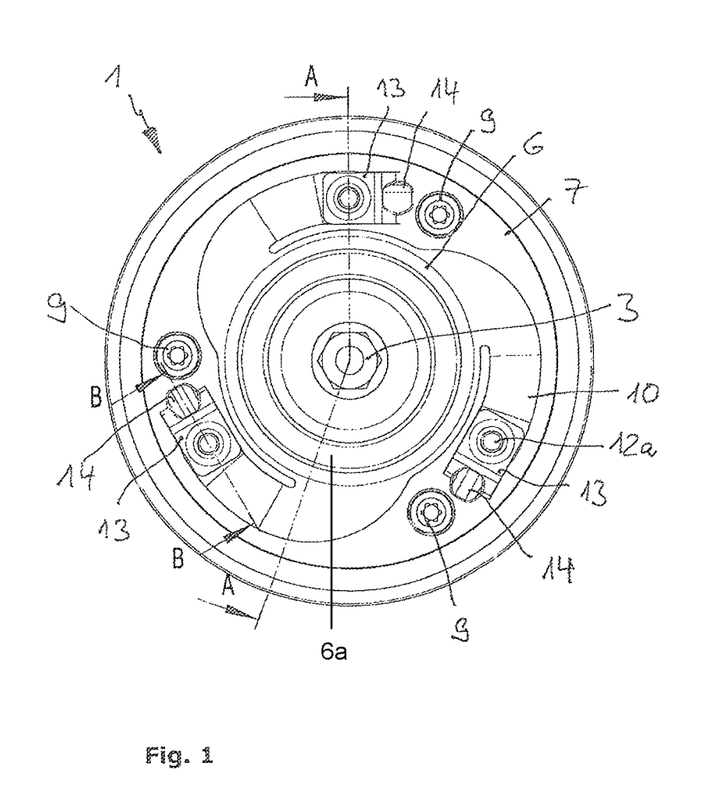
Figure 2:
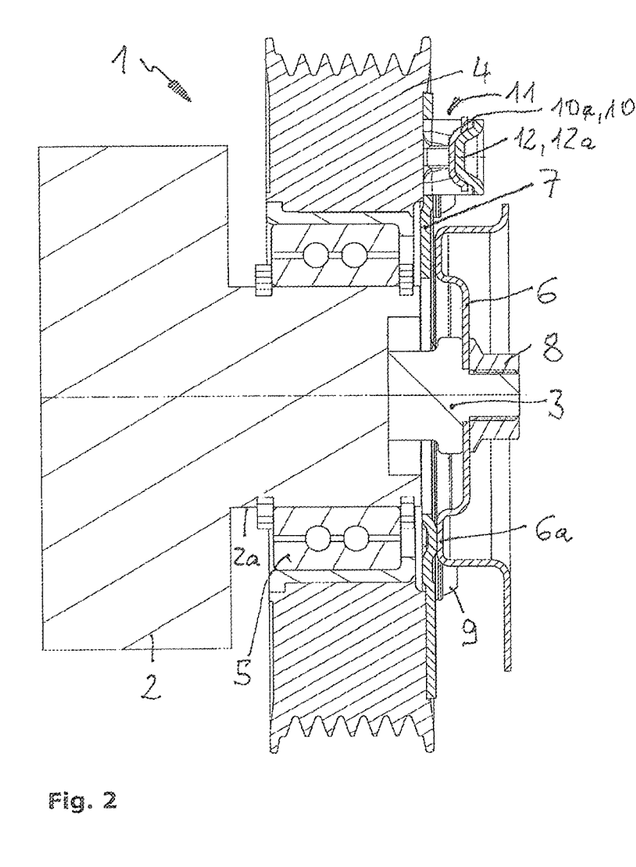
Figure 3:
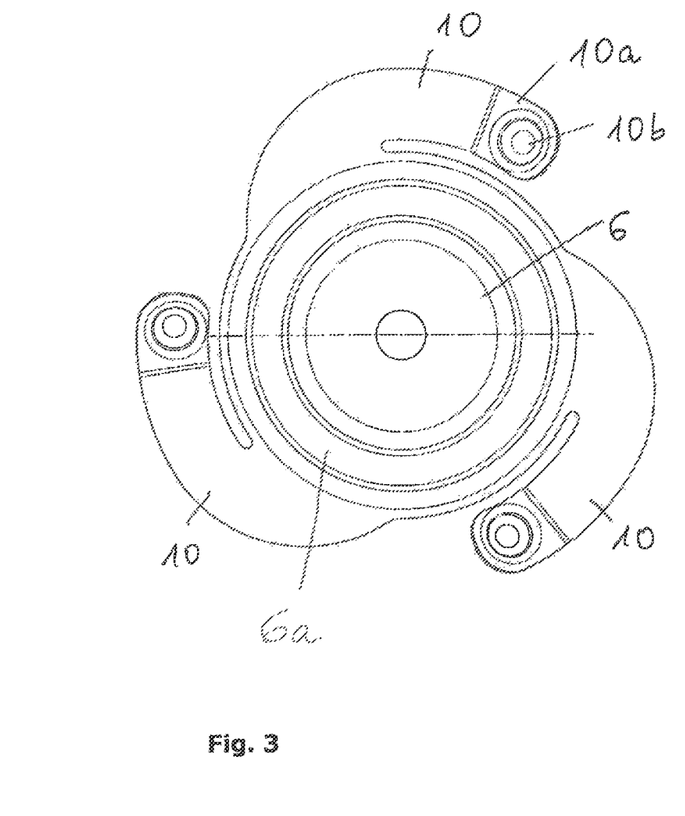
Figure 4:
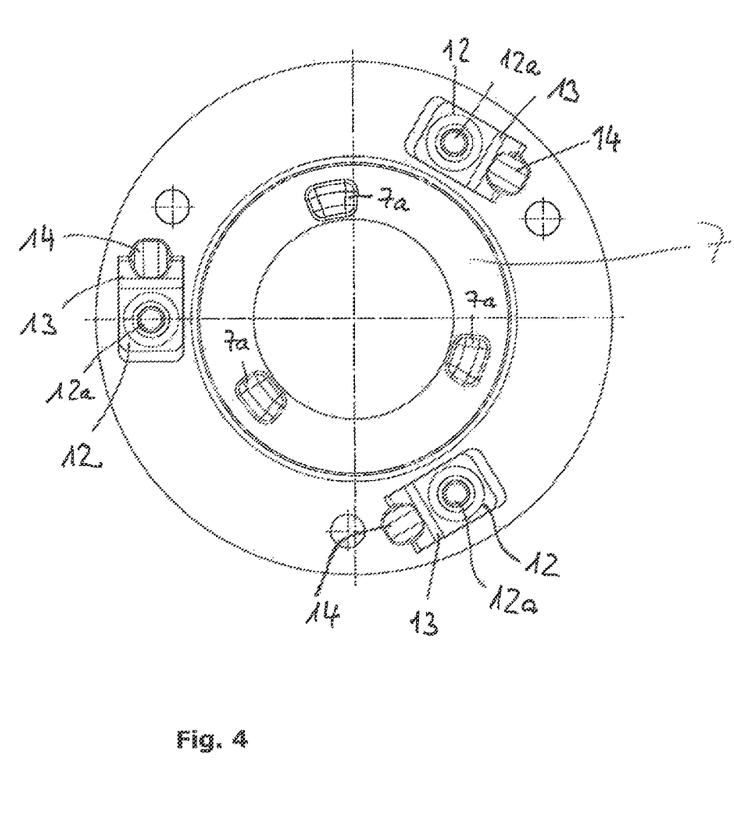

In order to allow a transfer of force or torque from the driver 7 to the spring washer 6 and thereby from the pulley 4 to the compressor shaft 3, the spring washer 6 has three spring arms 10 in the exemplary embodiment, which arms are disposed symmetrically distributed over the circumference of the spring washer 6, extend radially outside of the circumference of the actual spring washer 6, and are angled away in the circumference direction. These spring arms 10, which can be best seen in FIG. 3, are deflected in the direction toward the driver 7, so as to be resiliently axially offset relative to the actual spring washer 6, toward their ends 10a. These spring arms 10 serve to produce a force-fit and/or shape-fit connection with the driver 7, which connection is active up to a predetermined torque, but is cancelled out when a predetermined torque is exceeded, so that the overload protection device becomes active. For this purpose, the disk-shaped driver 7 has a connection element for each spring end 10a, in each instance, at a corresponding location, which element is configured as a pocket-shaped mounting 11, wherein the pocket-shaped mounting 11 has a contact surface 12 that is oriented parallel to the main surface of the driver 7. In this embodiment, the pocket-shaped mounting 11 is a cup-shaped mounting.

The respective spring end 10a therefore engages into the respective assigned pocket-shaped mounting 11 of the driver 7 and lies against the contact surface 12 of the pocket-shaped mounting 11 with force fit, under spring tension. As long as the torque to be transferred does not become too great, transfer of torque between the spring washer 6 and the driver 7 or between the pulley 4 and the compressor shaft 3 is thereby possible. However, if the torque becomes too great, if the compressor shaft 3 is jammed, for example, the spring ends 10a slip out of the pocket-shaped mountings 11 in a manner that will be described in greater detail below, so that the transfer of torque is interrupted and the pulley 4 can rotate freely.

In order to achieve not only the pure force-fit connection between the spring ends 10a and the pocket-shaped mounting 11, but also, in addition, a shape-fit connection, it is preferably provided that the respective end 10a of the spring arm 10 and the respective contact surface 12 have shaped elements that are configured to be complementary to one another. These shaped elements are configured as concave or convex regions 10b, 12a, in the exemplary embodiment, depending on the viewing direction.

The respective pocket-shaped mounting 11 of the driver 7 is configured, in the exemplary embodiment, as a hook-shaped crosspiece 13 that is cut out from the driver 7 in certain regions, in each instance, which crosspiece forms the contact surface 12 having a concave or convex region 12a on the free end side. The hook-shaped crosspiece 13 preferably has an additional reinforcement 14 adjacent to its articulation toward the actual driver 7, which reinforcement is preferably configured as a surface stamping of this crosspiece region.

As is evident from the above description, the overload protection device of the apparatus 1 fundamentally consists of only two pieces, namely the spring washer 6 and the driver 7. The two parts are joined together before installation, preferably to form a separable unit. Final installation takes place by means of pushing them onto the compressor shaft 3 and tightening the connection element, in the exemplary embodiment the nut 8. Alternatively, the compressor shaft 3 can, of course, also have an inner bore having an inside thread. To attach the spring washer 6 to the end of the compressor shaft 3, not a nut 8 but rather an attachment screw is used, accordingly. The driver 7, which is not connected with the compressor shaft 3 with its inside bore, which is greater as compared with the compressor shaft 3, is attached to the pulley 4 by means of the screws 9.

During pre-assembly of the overload protection device, the spring washer 6 and the driver 7 are braced against one another by way of the spring arms 10 and the pocket-shaped mountings 11. In this regard, a force-fit connection takes place, on the one hand, by means of the spring-loaded deflection of the spring ends 10a against the contact surfaces 12 of the pocket-shaped mountings 11, and on the other hand, a shape-fit connection additionally takes place by way of the concave and convex regions 10b, 12a . The shape of these concave regions 10b, 12a is fundamentally freely selectable; they are spherical, conical or cylindrical, for example. The reinforcements 14 serve to reinforce the crosspieces 13 of the pocket-shaped mountings 11; they prevent the crosspieces 13 from being bent away. During bracing, the spring arms 10 are brought from a neutral, load-free position into a braced position, thereby generating a press-down force F that presses the spring washer 6 onto or against the driver 7.

Figure 5:
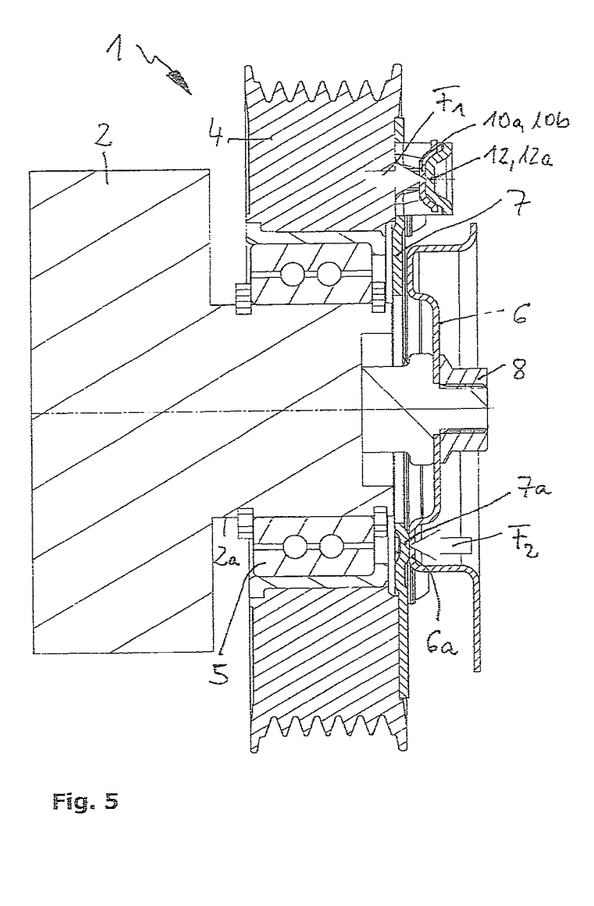
Figure 6:
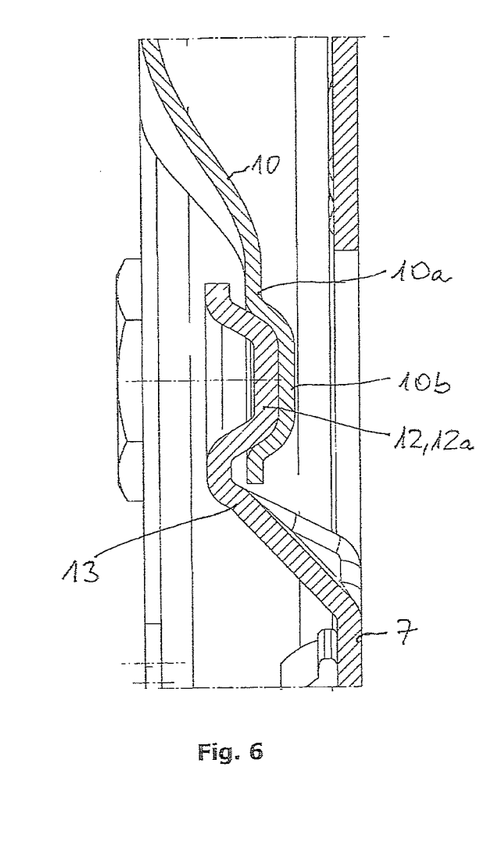

The force F is determined by the geometry and the sheet-metal thickness of the spring arms 10, the elasticity of the spring steel used, and the deflection of the spring arms 10. In this regard, the spring washer 6 supports itself on the driver 7 with a circumferential projection 6a, and thereby the spring washer 6 and the driver 7 form a unit that is force-free toward the outside. This is evident from FIG. 5; the forces F1 and F2 are equal in size, so that force equilibrium exists. The driver 7 can have multiple contact surfaces 7a distributed symmetrically over the circumference, for contact with the projection 6a of the spring washer 6, which surfaces are configured as convex regions.

Figure 7:
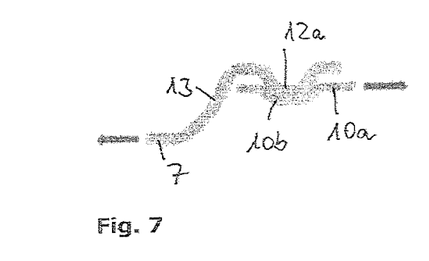
Figure 8:
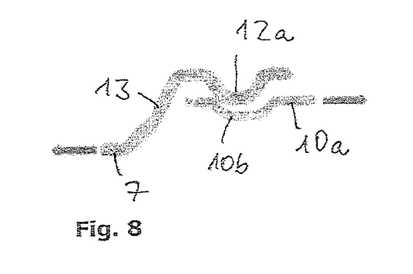
Figure 9:
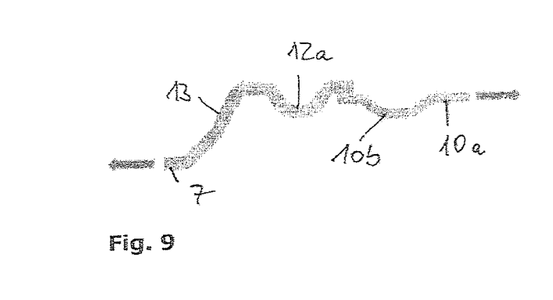
Figure 10:
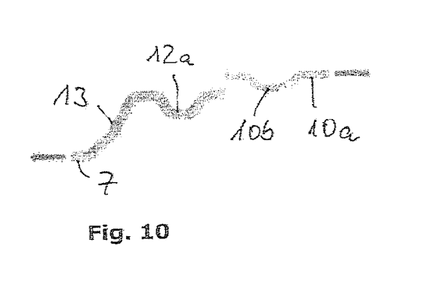

During operation, the pulley 4 is driven by the belt of the internal combustion engine, not shown. The torque produced during this process is transferred by way of the spring washer 6 and the driver 7. Thereby a tangential force is introduced into the spring washer 6 by way of the pocket-shaped mountings 11 and crosspieces 13. The spring washer 6 in turn drives the compressor shaft 3 by means of the torque-proof connection by way of the nut 8. If rotation of the compressor shaft 3 is prevented during operation—for example due to a malfunction—the force that acts on the connection between the spring washer 6 and the driver 7 increases. If the force or the torque exceeds a predetermined amount, the spring ends 10a can slip out of the pocket-shaped mountings 11. They slide on one another until the connection is completely released. This disengagement process is shown in FIGS. 7 to 10. In this regard, FIG. 7 shows the starting state, FIG. 8 shows the beginning of disengagement, FIG. 9 shows the end of disengagement, and FIG. 10 shows the uncoupled final state.

The maximal force that can be transferred is determined by the contact angle of the concave and convex regions 10b, 12a, the friction coefficients of the contact partners, and the bias force of the spring arms 10.

The spring arms 10 can return to the load-free position after complete separation from the driver 7. Because the rotation of the pulley 4 is then uncoupled from the rotation of the compressor shaft 3, the belt of the pulley 4 is not stressed by the malfunction of the compressor. Because the spring washer 6 and the driver 7 are separated and the spring arms 10 lie axially offset from the pocket-shaped mountings 11 of the driver 7, free rotation of the driver 7 and thereby also of the pulley 4 can take place.

Figure 11:
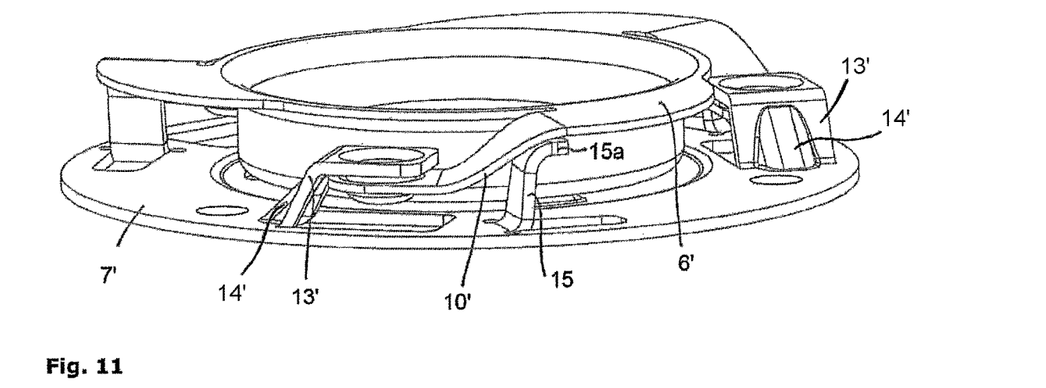
Figure 12:
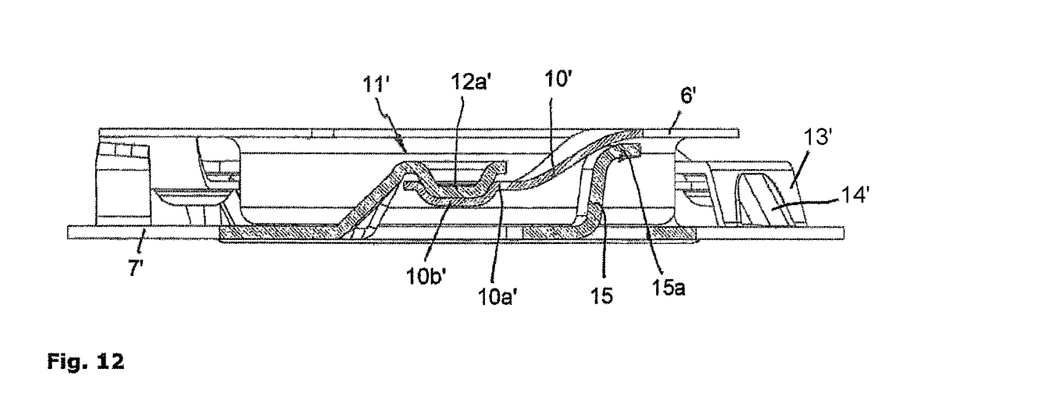

In FIGS. 11 and 12, an additional embodiment of the apparatus 1 is shown, which differs from the embodiments described above in that the disk-shaped driver 7' additionally has a supporting arm 15 on the circumference, adjacent to the respective crosspiece 13', which arm is directed toward the related spring arm 10' and lies against it. In this regard, this supporting arm 15 is preferably configured as a crosspiece cut out of the driver 7' in certain regions, which crosspiece extends essentially axially in the installed position, and is preferably angled away in arc shape in the region of its free end 15a, so that the free end 15a lies against the related spring arm 10' over its full area. The spring washer 6' would be connected with a compressor shaft so as to rotate with it. The ends 10a' of the spring arm 10' and the respective contact surface have shaped elements that are configured to be complementary to one another, e.g. these shaped elements are configured as concave or convex regions 10b', 12a', in the exemplary embodiment. In this embodiment, the crosspiece 13' preferably has an additional reinforcement 14' adjacent to its articulation toward the actual driver 7', which reinforcement 14' is preferably configured as a surface stamping of this crosspiece region.

The spring tension of the spring arms 10' can be better regulated by means of suitable dimensioning of the supporting arm 15. Furthermore, the supporting arms 15 guarantee, in the uncoupled state that is not shown, in which the ends 10a' of the spring arms 10' are situated above the pocket-shaped mountings 11' in the sense of FIGS. 11 and 12, that the spring arms 10' cannot come into contact with the driver 7', which could otherwise lead to undesirable noises or the like.

Of course, the invention is not restricted to the exemplary embodiment shown. Further embodiments are possible without departing from the fundamental idea. Thus, the type of torque-proof connection between the driver 7 and the pulley 4 as well as between the spring washer 6 and the compressor shaft 3 can also be configured differently; the same also holds true for the concave and convex regions 10b, 12a, which can also be eliminated completely, if applicable, so that only a force-fit connection exists. Furthermore, the spring washer 6 can also be firmly connected with the pulley 4, and the driver 7 can be firmly connected with the compressor shaft 3.

REFERENCE SYMBOL LIST 1 apparatus
2 compressor housing
2a attachment
3 compressor shaft
4 pulley
5 bearing
6 spring washer
6a circumferential projection
7 driver
7a contact surfaces
8 nut
9 screws
10 spring arms
10a ends
10b concave or convex region
11 pocket-shaped mounting
12 contact surface
12a concave or convex region
13 crosspieces
14 reinforcements
15 supporting arm

The invention claimed is:

1. Apparatus for transfer of a torque from an internal combustion engine to an auxiliary unit, particularly a compressor of an air conditioning system of a motor vehicle, having an auxiliary unit housing, an auxiliary unit shaft, and a pulley disposed on the auxiliary unit housing so as to rotate, the apparatus comprising:
an overload protection device configured to connect the pulley and the auxiliary unit shaft with one another, wherein the overload protection device is configured in such a manner that the connection between the pulley and the auxiliary unit shaft is interrupted if a predetermined torque is exceeded, wherein the overload protection device has
a disk-shaped driver having connection elements, and
a spring washer having multiple spring arms, which are connected, on the end side, with the connection elements of the disk-shaped driver until the predetermined torque is reached,
wherein the respective connection element of the disk-shaped driver is configured as a cup-shaped mounting in the disk-shaped driver, in each instance,
wherein the end of the respective spring arm lies against a contact surface of the cup-shaped mounting under spring tension, with force fit,
wherein the respective cup-shaped mounting is configured as a crosspiece formed in hook shape and cut out of the disk-shaped driver in certain regions, and
wherein the contact surface of the cup-shaped mounting is oriented parallel to a main surface of the disk-shaped driver.

2. Apparatus according to claim 1, wherein the end of the respective spring arm and the respective contact surface have shaped elements that are coordinated with one another.

3. Apparatus according to claim 2, wherein the shaped elements are configured as concave or convex regions.

4. Apparatus according to claim 1, wherein the crosspiece is provided with an additional reinforcement.

5. Apparatus according to claim 1, wherein the crosspiece is configured to be resilient.

6. Apparatus according to claim 1, wherein the driver has a supporting arm directed toward the related spring arm and lying against it, circumferentially adjacent to the respective crosspiece.

7. Apparatus according to claim 6, wherein the respective supporting arm is configured as a crosspiece that is cut out from the driver in certain regions.

8. Apparatus according to claim 1, wherein the spring washer has at least three symmetrically distributed spring arms.

9. Apparatus according to claim 1, wherein the spring washer has a circumferential projection that lies against the driver, as long as the predetermined torque is not exceeded.

10. Apparatus for transfer of a torque from an internal combustion engine to an auxiliary unit, particularly a compressor of an air conditioning system of a motor vehicle, having an auxiliary unit housing, an auxiliary unit shaft, and a pulley disposed on the auxiliary unit housing so as to rotate, the apparatus comprising:
an overload protection device configured to connect the pulley and the auxiliary unit shaft with one another, wherein the overload protection device is configured in such a manner that the connection between the pulley and the auxiliary unit shaft is interrupted if a predetermined torque is exceeded, wherein the overload protection device has
a disk-shaped driver having connection elements, and
a spring washer having multiple spring arms, which are connected, on the end side, with the connection elements of the disk-shaped driver until the predetermined torque is reached,
wherein the respective connection element of the disk-shaped driver is configured as a pocket-shaped mounting in the disk-shaped driver, in each instance,
wherein the end of the respective spring arm lies against a contact surface of the pocket-shaped mounting under spring tension, with force fit,
wherein the respective pocket-shaped mounting is configured as a crosspiece formed in hook shape and cut out of the disk-shaped driver in certain regions, and
wherein the disk-shaped driver has a supporting arm directed toward the related spring arm and lying against the related spring arm, circumferentially adjacent to the respective crosspiece.

11. Apparatus according to claim 10, wherein the respective supporting arm is configured as a crosspiece that is cut out from the disk-shaped driver in certain regions.

* * * * *